US008573960B2

United States Patent
Gámez Moreno

(10) Patent No.: US 8,573,960 B2
(45) Date of Patent: Nov. 5, 2013

(54) MOLD ASSEMBLY WITH INTERCHANGEABLE INSERT FOR BLOW-MOLDING

(75) Inventor: Gaspar Gámez Moreno, La Fe, San Nicolás de los Garza (MX)

(73) Assignee: Ipar Mold S.A. de C.V., Nuevo Leon (MX)

( * ) Notice: Subject to any disclaimer, the term of this patent is extended or adjusted under 35 U.S.C. 154(b) by 343 days.

(21) Appl. No.: 13/105,672

(22) Filed: May 11, 2011

(65) Prior Publication Data

US 2012/0288582 A1 Nov. 15, 2012

(51) Int. Cl.
*B29C 49/48* (2006.01)

(52) U.S. Cl.
USPC ............................ 425/182; 425/195; 425/541

(58) Field of Classification Search
USPC ......................................... 425/182, 195, 541
See application file for complete search history.

(56) References Cited

U.S. PATENT DOCUMENTS

| | | | | |
|---|---|---|---|---|
| 3,768,948 A * | 10/1973 | Horberg et al. | ............... | 425/526 |
| 3,784,344 A * | 1/1974 | Korsch | ........................... | 425/526 |
| 5,968,560 A * | 10/1999 | Briere et al. | ............... | 425/192 R |
| 6,428,302 B1 * | 8/2002 | Tsau | ........................... | 425/192 R |
| 6,648,623 B2 * | 11/2003 | Petre | ............................. | 425/195 |
| 6,843,646 B2 * | 1/2005 | Ryan et al. | ..................... | 425/195 |
| 6,948,924 B2 * | 9/2005 | Tsau et al. | ..................... | 425/195 |
| 7,338,272 B2 * | 3/2008 | Miller | ............................. | 425/182 |
| 8,038,429 B2 * | 10/2011 | Linke et al. | .................... | 425/195 |
| 2007/0042070 A1 * | 2/2007 | Hallink | ........................ | 425/195 |
| 2011/0052743 A1 * | 3/2011 | Langlois | ....................... | 425/182 |

\* cited by examiner

*Primary Examiner* — James Sanders

(74) *Attorney, Agent, or Firm* — IpHorgan Ltd.

(57) ABSTRACT

A blow-molding mold assembly comprising: a base mold cavity located within the mold-holder of a molding machine, characterized in that the assembly includes an interchangeable insert located within the base mold cavity; the base mold cavity having in its left side a gliding locking means and in its right side having fixed locking means, and the interchangeable insert having in its left and right sides grooves to receive the locking means corresponding to each side of the base mold cavity to avoid rotational movement of the interchangeable insert, the interchangeable insert having further an exterior edge to be housed in an interior recess of the base mold cavity to avoid longitudinal movement of the interchangeable insert.

2 Claims, 4 Drawing Sheets

MOLD ASSEMBLY WITH INTERCHANGEABLE INSERT FOR BLOW-MOLDING

TECHNICAL FIELD

The present utility model is related to blow-molding, and particularly to a mold assembly having inserts to change the blow-molded object form, such as beverage bottles.

PRIOR ART

Generally all blow-molding processes comprise obtaining a blank or parison, that is a tubular element or in test-tube form, fixing it into the blowing mold and, at a specific temperature for each material to have sufficient consistency, injecting air to its interior so that it adapts to the mold walls, allowing its cooling under pressure and opening the mold to withdraw it after sufficient consistency has been reached.

An example of the above mentioned, is found within the state of the art in the U.S. Pat. No. 7,258,538 document, which disclosed a blowing mold assembly integrated by coupling first and second mold elements, each coupling mold component comprising mold surfaces open to a coupling face of the mold components and defining the exterior of an article to be molded from a tubular blank or parison and at least one height insert. The height and the number of height inserts are selected according to a longitudinal extent required of the article to be molded, each height insertion is held in the coupling mold component by retention means held in the mold component during the inserting and extraction of the height insert. A blow-molding machine comprises a press mechanism to operate a mold assembly.

This blow-molding method results in a great loss of production time or idle time which is spent when changing the complete molds, by complete dismounting said molds from the blow-molding machine, when containers of different geometric forms are required to be manufactured; furthermore, said molds are very heavy and require adjustments and connections, among others, to the cooling system of the blow-molding machine.

Also the mold manufacturing cost is very high, therefore the manufacturing cost of several molds for producing different geometries is very high for the manufacturer, furthermore, the delivery time for each mold is to be considered an important issue as these usually are deliverable after a considerable amount of time, which must be managed very carefully as any error in said process would result in an important delay in the manufacturing of the final product.

In view of the above mentioned disadvantages, one of the advantages of the subject system of the present application is the manufacturing time, which is 50% lower than that for a conventional mold, which accelerates the delivery time; this is because the present system works on the basis of inserts which are located within a cavity formed into a traditional mold, which allows that a single mold may act as a base mold for the different interchangeable inserts of different geometries. It is important to point out that the useful life of the insert is the same as that for the complete conventional mold, since it is not a wearable piece.

Furthermore the mold assembly having interchangeable inserts greatly simplifies the geometry or configuration of the container configuration, achieving a lowering in 80% the operation times in said activity, and this is achieved by not effecting any adjustment or modifications in the connections of all mold components installed in the machine, said connections that can be considered as firmly attached to the base mold, which does not require to be dismounted from the machine to produce diverse geometries, limiting in this manner the lost time previously required to the time necessary just to change the insert with another geometry.

The mechanical adjustments to be avoided are:
a) Changing the stops of stretching bars,
b) Adjusting the stretching bars,
c) Changing the mold faces,
d) Adjusting the mold face compensation (when necessary),
e) Changing the bottom,
f) Adjustment of the closure of mold faces with the bottom (when necessary).

The present utility model provides a blow and stretching (bi-oriented) mold, in which a cavity is housed, wherein an interchangeable insert is located, having in this manner the possibility to get all forms of the product to be molded, which can be interchanged by another one having different form maintaining the volume and height, resulting in time savings when changing the form, as well as savings in capital investment by investing only in a complete mold set and only the interchangeable insert sets for every form required.

This system is fast and easy to manipulate as the interchangeable parts (inserts) are of light weight as compared to traditional molds, thereby the changing process is easier to the user by lowering importantly the intervention time in a machine to change form, saving production time in said machine.

The assembly of the present application provides an innovative mechanism making easier the change of product form to be molded without changing the entire mold. This assembly uses lesser tools, requires the handling of lesser parts and consequently generates economic savings, making the industry more profitable.

With the assembly of the present invention this object is achieved, by means of manufacturing an interchangeable insert housed in the mold cavity, which is provided with a locking groove securing a perfect coupling of the interchangeable insert with the fixed part of the mold, achieving in this manner the changes in presentation in production lines, reducing operative expenses. For changing the presentation in the mold assembly, just a single tool is necessary (Allen key) and manipulating only a piece (insert) to achieve a change in the total form, furthermore there is no need to use any other device or machine accessory.

The present utility model overcomes the current blow mold technology with the mold assembly having interchangeable inserts, which is displaced in the cavity, guided by a groove acting as a guide, reaching a stop securing its position and by a fixation means having a linear displacement, the insert is secured once it has been installed in the cavity, such that no possibility of movement thereof exists, forming a solid structure in the fixed part of the mold as a single piece.

The mold assembly of the present invention is a single piece that by substituting the same, the form of the product to be molded changes entirely, reducing the risks caused by the wearing as a consequence of having several pieces combined to form the product to be molded, such as it is presented in multi-part assemblies of the state of the art.

Additionally, a single light-weight piece is to be manipulated, that in addition to facilitating the form change, also facilitates manipulation of the pieces due to the size and weight of the inserts, optimizing simultaneously the places for its storage and transportation from the original place to the machine to be utilized.

By having more than a part, it makes more complex and slow the process of changing the form of the product to be molded in a machine, if we take into account that this operation must be repeated the number of times as the number of stations the machine has.

The assembly of the present application combines flexibility, rate and security in changing an insert, as it has an edge in the external part of insert, which slides in a recess of the mold cavity, securing in this manner an accurate and smooth displacement allowing the correct alignment of the insert into the mold, furthermore the locking means makes possible the attachment or coupling of the insert, making a secure and firm coupling, providing confidence to the molding operation.

Neither additional screwing is required to secure the locking of the insert, this is achieved only with the insert itself, as it has an external edge, and the locking means of the mold cavity that does not need to be removed to change an insert, but it suffices to loosen two screws and displace the locking means to change the insert, then displace again the locking means and screw-in the screws with the new insert installed. This provides the additional advantage of requiring just a single Allen key of 4 mm, which is sufficient to carry out the change of form when using this innovative system.

In order to overcome the disadvantages of the state of the art, the present utility model provides a blow-molding mold assembly comprising: a base mold cavity, disposed within a mold carrier of a molding machine, characterized in that the assembly includes an interchangeable insert disposed into the base mold cavity; the base mold cavity having in its left side a slide locking means and in its right side fixed locking means, and the interchangeable insert having in its left side and right side, grooves to receive the corresponding locking means corresponding to each side of the base mold cavity to avoid rotational movement of the interchangeable insert; the interchangeable insert having further an exterior edge to be inserted in an interior recess of the base mold cavity to avoid longitudinal movement of the interchangeable insert; the locking means are secured to the base mold cavity by means of screws and the sliding locking means having a configuration substantially in "C" form, having in each end, extended borings for displacement of the sliding locking means.

BRIEF DESCRIPTION OF THE FIGURES

In order to provide a better understanding of the utility model, a description thereof is provided below, along with the accompanying drawings, wherein.

DETAILED DESCRIPTION

Figure 1:
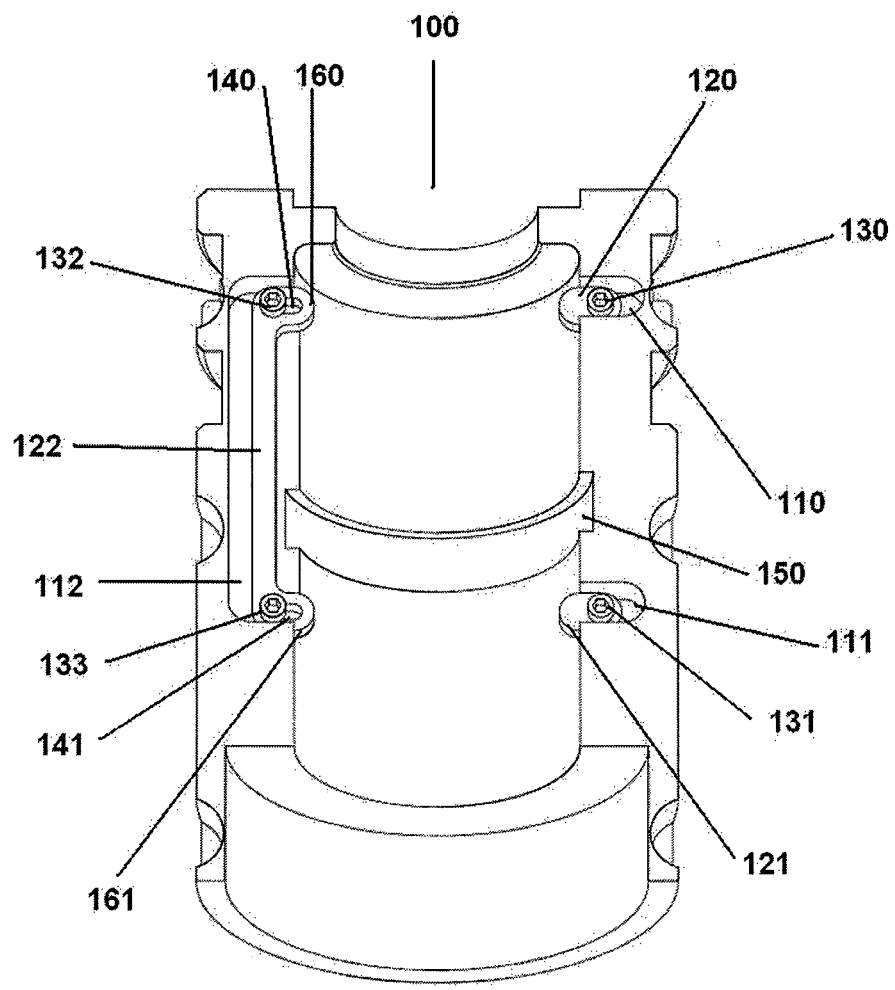
FIG. 1 is a top perspective view of the base mold cavity of the mold assembly according to the present utility model.
Figure 2:
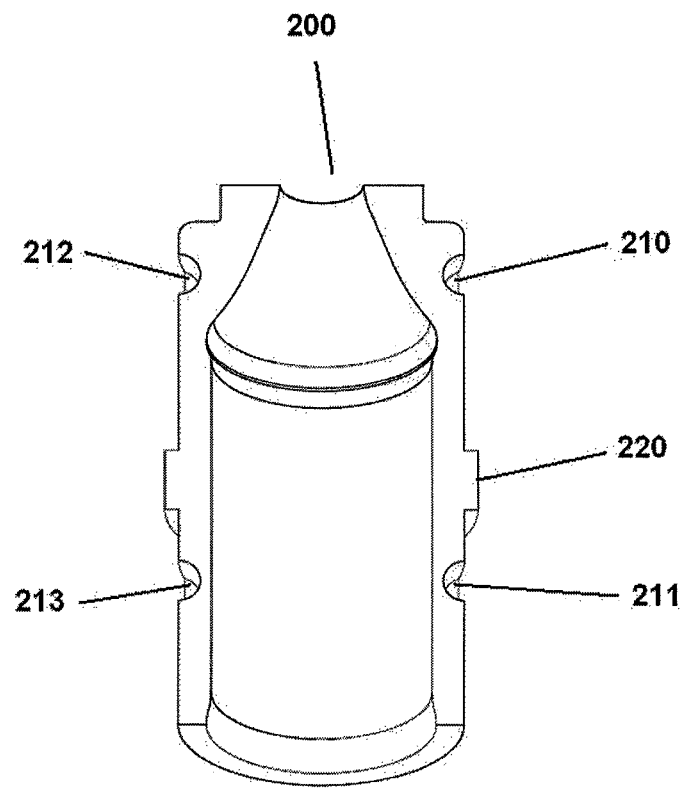
FIG. 2 is a top perspective view of the interchangeable insert that is to be located in the base mold cavity to form the mold assembly according to the present utility model.

Referring to FIGS. 1 and 2, a base mold cavity (100) is shown, that is to be installed in the mold-holder of the blow-molding machine (not illustrated), said base mold cavity (100) includes locking grooves (110, 111, 112), disposed on the lateral edges of the base mold cavity (100). Also, within said grooves (110, 111, 112), locking means (120, 121, 122) are mounted, which are fixed to the base mold cavity (100) by means of locking screws (130, 131, 132, 133).

The locking grooves (110, 111) are located in the top and bottom parts of the right lateral edge of the base mold cavity (100), and each housing a lock (120, 121) fixed by locking screws (130, 131). The locking groove (112) is located in the left lateral edge of the base mold cavity (100), and housing a lock (122) having a configuration substantially in "C" form, having extended borings (140, 141) in their ends to allow that lock (122) slides into the locking groove (112).

In the internal part of the base mold cavity (100) is located an internal recess (150) to receive an external edge (220) of an interchangeable insert (200) illustrated in FIG. 2, avoiding in this manner the longitudinal movement of the interchangeable insert (200).

The interchangeable insert (200) has locking grooves (210, 211, 212, 213) wherein the locks (120, 121, 122) are to be inserted, locking in this manner the interchangeable insert (200) to the base mold cavity (100).

Figure 3:
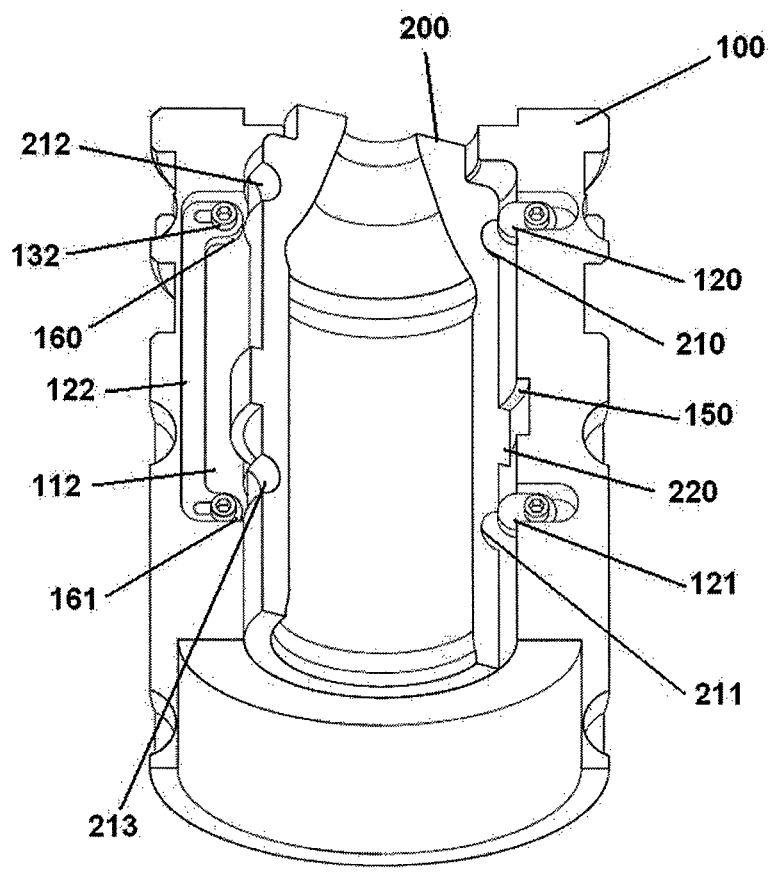
FIG. 3 is a top perspective view of the mold assembly of the present invention, wherein the interchangeable insert is not fixed into the mold cavity.
Figure 4:
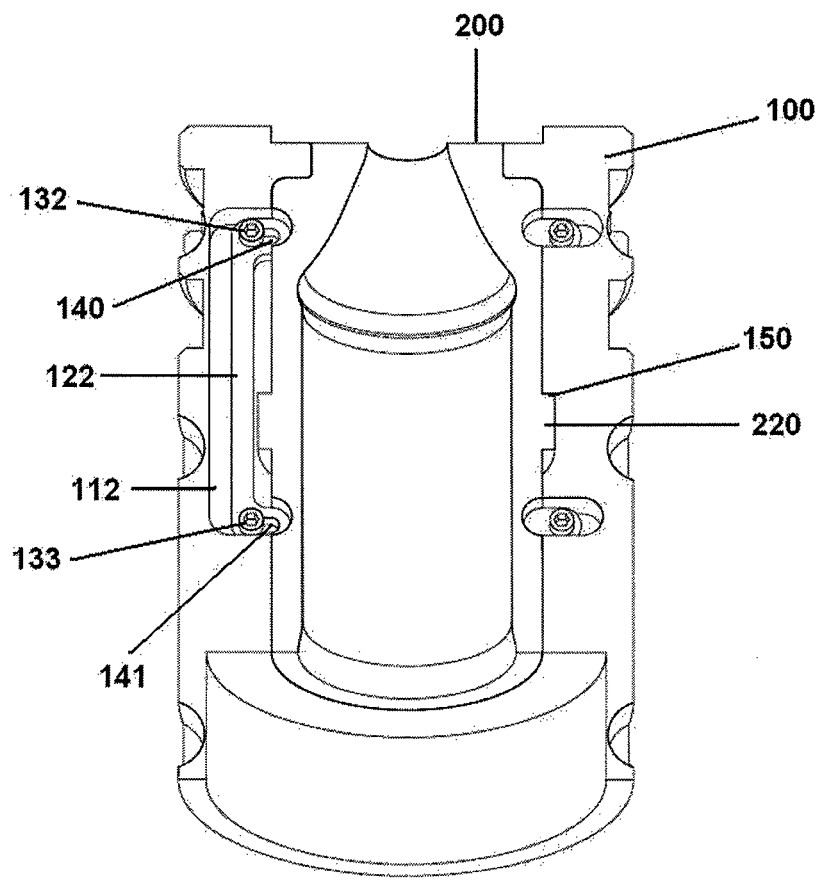
FIG. 4 is a top perspective view of the mold assembly of the present invention with the insert fixed into the mold cavity.

In FIGS. 3 and 4, there is illustrated the manner in which the interchangeable insert (200) is located on the base mold cavity (100). The lock (122) is located in a position totally towards the left from the locking groove (112), so that the interchangeable insert (200) may enter through the left side of the base mold cavity (100). The locks (120, 121) located in the right side of the base mold cavity (100), act as stops and they are located in their final position in the grooves (210, 211) of the interchangeable insert (200) when this is assembled into the base mold cavity (100), simultaneously the internal recess (150) receives the external edge (220) of the interchangeable insert (200), avoiding in this manner the longitudinal movement of the interchangeable insert (200). Once the interchangeable insert (200) is in completely into the base mold cavity (100), the lock (122) is displaced towards the right and is fixed by means of locking screws (132, 133), limiting in this manner the rotational movement of the interchangeable insert (200), obtaining an accurate adjustment and perfect thermal transference between the interchangeable insert (200) and base mold cavity (100). The ends (160, 161) of the lock (122) are inserted into the grooves (212, 213) of the interchangeable insert (200). The displacement of the lock (122) into the locking groove (112) is possible due to the extended borings (140, 141). The locking screws (130, 131, 132, 133) can be of Allen type or any other similar locking means.

The present utility model has been disclosed in its preferred embodiment, however, it is clear that a person skilled in the art could conceive various changes and modifications of the invention, without departing from the scope of the following claims.

The invention claimed is:

1. A blow-molding mold assembly comprising: a base mold cavity located within the mold-holder of a molding machine, characterized in that the assembly includes an interchangeable insert located within the base mold cavity; the base mold cavity having in its left side a sliding locking means and in its right side having fixed locking means, and the interchangeable insert having in its left and right sides grooves to receive the locking means corresponding to each side of the base mold cavity to avoid rotational movement of the interchangeable insert, the interchangeable insert having further an exterior edge to be housed in an interior recess of the base mold cavity to avoid longitudinal movement of the interchangeable insert; wherein the sliding lock means having a configuration substantially in "C" form; and wherein the sliding locking means having, in each of its ends, extended borings for displacement of the sliding locking means.

2. The assembly in accordance to claim 1, wherein the locking means are locked to the base mold cavity by means of screws.

* * * * *